(12) United States Patent
Kulmann et al.

(10) Patent No.: US 10,789,073 B2
(45) Date of Patent: Sep. 29, 2020

(54) PROCESSING UNIT SUBTYPE CONFIGURATION

(71) Applicant: International Business Machines Corporation, Armonk, NY (US)

(72) Inventors: Fabian Kulmann, Bondorf (DE); Angel Nunez Mencias, Stuttgart (DE); Benno Schuepferling, Boeblingen (DE); Jakob Christopher Lang, Tuebingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 64 days.

(21) Appl. No.: 16/223,296

(22) Filed: Dec. 18, 2018

(65) Prior Publication Data

US 2020/0192677 A1    Jun. 18, 2020

(51) Int. Cl.
*G06F 9/4401* (2018.01)
*G06F 21/10* (2013.01)
*G06F 9/455* (2018.01)
*G06F 8/61* (2018.01)

(52) U.S. Cl.
CPC .......... *G06F 9/4405* (2013.01); *G06F 9/441* (2013.01); *G06F 9/4406* (2013.01); *G06F 21/105* (2013.01); *G06F 8/63* (2013.01); *G06F 9/45558* (2013.01); *G06F 2009/45579* (2013.01); *G06F 2009/45583* (2013.01); *G06F 2221/0704* (2013.01)

(58) Field of Classification Search
CPC ...... G06F 9/4405; G06F 9/4406; G06F 9/441; G06F 21/105
See application file for complete search history.

(56) References Cited

U.S. PATENT DOCUMENTS

| | | | |
|---|---|---|---|
| 8,645,965 | B2 | 2/2014 | Zimmer et al. |
| 8,892,916 | B2 | 11/2014 | Bieswanger et al. |
| 9,038,084 | B2 | 5/2015 | Accapadi et al. |
| 9,122,534 | B2 | 9/2015 | Accapadi et al. |
| 9,244,826 | B2 | 1/2016 | Nayar et al. |

(Continued)

OTHER PUBLICATIONS

M. Tilev, et al., CapSys: A Tool for Macroscopic Capcity Planning of IBM Mainframe Systems, ICB-Research Report No. 26., Sep. 2008, 33 pages.

*Primary Examiner* — Glenn A. Auve
(74) *Attorney, Agent, or Firm* — Cantor Colburn LLP; William Kinnaman

(57) ABSTRACT

An aspect includes receiving a request to boot a software image on a machine including a plurality of processing units having different characteristics. A processing unit subtype identifier is extracted from a license record for the machine. The processing unit subtype identifier includes a software image type and an allocation of the processing units of the processing unit subtype. A processing unit capability of the machine is queried. The software image is enabled with the allocation of the processing units based on verifying that a software image identifier of the software image matches the software image type from the processing unit subtype identifier, and the processing unit capability of the machine meets the allocation of the processing units from the processing unit subtype.

20 Claims, 10 Drawing Sheets

(56) References Cited

U.S. PATENT DOCUMENTS

| | | | |
|---|---|---|---|
| 2015/0227723 A1* | 8/2015 | Tylik | G06F 9/4401 726/26 |
| 2017/0235928 A1* | 8/2017 | Desai | G06F 9/4401 713/2 |
| 2019/0026442 A1* | 1/2019 | Perlman | H04L 9/0897 |

* cited by examiner

PROCESSING UNIT SUBTYPE CONFIGURATION

BACKGROUND

The present invention relates to computer systems, and more particularly, to processing unit subtype configuration.

Computer systems can include a variety of processing resources that can be shared between multiple applications and/or multiple logical partitions. Computer systems may also support multiple operating systems that run in separate logical partitions. Some logical partitions may be assigned to dedicated processing resources, while other logical partitions may share processing resources across multiple logical partitions. Some logical partitions can end up with more processing resources assigned than are needed by workloads intended to be executed on the logical partitions. This inefficient allocation of resources can limit computer system performance, as shared processing resources may be blocked from use by other logical partitions and/or applications that could otherwise make use of the resources.

SUMMARY

According to a non-limiting embodiment, a computer-implemented method includes receiving a request to boot a software image on a machine including a plurality of processing units having different characteristics. A processing unit subtype identifier is extracted from a license record for the machine. The processing unit subtype identifier includes a software image type and an allocation of the processing units of the processing unit subtype. A processing unit capability of the machine is queried. The software image is enabled with the allocation of the processing units based on verifying that a software image identifier of the software image matches the software image type from the processing unit subtype identifier, and the processing unit capability of the machine meets the allocation of the processing units from the processing unit subtype. Advantages can include allocating sufficient processing resources to support execution of a particular software image and retaining processing unit capability for execution of additional software images.

In addition to one or more of the features described above, or as an alternative to any of the foregoing embodiments, further embodiments may include adjusting an indicator of overall available processing units of the machine based on the allocation of the processing units with a plurality of deployed software images. Advantages can include tracking machine-level resource availability of processing units as deployment reduces available resources.

In addition to one or more of the features described above, or as an alternative to any of the foregoing embodiments, further embodiments may include adjusting an indicator of enablement availability of the software image type of the processing units based on deploying the software image. Advantages can include tracking availability of processing units for specific software image types.

In addition to one or more of the features described above, or as an alternative to any of the foregoing embodiments, further embodiments may include where the processing units include one or more of processor chips, memory resources, disk resources, and input/output card resources. Advantages can include allocating multiple types of processing resources.

In addition to one or more of the features described above, or as an alternative to any of the foregoing embodiments, further embodiments may include where the processing unit capability of the machine is shared across a plurality of logical partitions, and the software image and one or more other workloads are configured to execute in separate logical partitions. Advantages can include sharing of processing unit capabilities across multiple logical partitions.

In addition to one or more of the features described above, or as an alternative to any of the foregoing embodiments, further embodiments may include installing the license record on the machine responsive to receiving the software image and license record data, creating a processing unit subtype pool identifier on the machine that associates the allocation of the processing units with the software image type, and creating a logical partition pool that makes the processing unit subtype pool identifier and one or more identifiers associated with one or more other workloads available for selection in the logical partitions. Advantages can include making multiple types of logical partitions available.

In addition to one or more of the features described above, or as an alternative to any of the foregoing embodiments, further embodiments may include where the license record data associates the software image identifier, the allocation of the processing units, a duration, and an identifier of the machine responsive to a data exchange between a plurality of entities. Advantages can include constraining multiple parameters of software image deployment.

According to a non-limiting embodiment, a system includes a plurality of processing units on a machine, the processing units having different characteristics. The system also includes a processing circuit configured to perform a plurality of operations including receiving a request to boot a software image on the machine and extracting a processing unit subtype identifier from a license record for the machine. The processing unit subtype identifier includes a software image type and an allocation of the processing units of a processing unit subtype. The processing circuit is further configured to perform operations including querying a processing unit capability of the machine and enabling the software image with the allocation of the processing units based on verifying that a software image identifier of the software image matches the software image type from the processing unit subtype identifier and the processing unit capability of the machine meets the allocation of the processing units from the processing unit subtype. Advantages can include allocating sufficient processing resources to support execution of a particular software image and retaining processing unit capability for execution of additional software images.

According to a non-limiting embodiment, a computer program product includes a computer readable storage medium having program instructions embodied therewith. The program instructions are executable by a processing circuit to perform a plurality of operations including receiving a request to boot a software image on a machine including a plurality of processing units having different characteristics and extracting a processing unit subtype identifier from a license record for the machine. The program instructions executable by the processing circuit are further configured to perform operations including querying a processing unit capability of the machine and enabling the software image with the allocation of the processing units based on verifying that a software image identifier of the software image matches the software image type from the processing unit subtype identifier and the processing unit capability of the machine meets the allocation of the processing units from the processing unit subtype. Advantages can include allocating sufficient processing resources to support execution of a particular software image and retaining processing unit capability for execution of additional software images.

According to a non-limiting embodiment, a computer-implemented method includes receiving a software image file set and a capacity requirement at a software image distribution system, generating a software image based on the software image file set, generating a license record based on the capacity requirement, providing the software image and the license record to an external interface of the software image distribution system, and triggering an installation action, by the software image distribution system, on to a machine based on a request of an ordering system. Advantages can include controlling software image distribution with capacity requirements to be allocated at deployment.

In addition to one or more of the features described above, or as an alternative to any of the foregoing embodiments, further embodiments may include where triggering the installation action further includes sending the software image and the license record to the machine. Advantages can include transmission of the software image and the license record to the machine.

In addition to one or more of the features described above, or as an alternative to any of the foregoing embodiments, further embodiments may include sending a completion notification including a payment request from the software image distribution system to the ordering system. Advantages can include controlling a completion process.

In addition to one or more of the features described above, or as an alternative to any of the foregoing embodiments, further embodiments may include receiving a payment at the software image distribution system responsive to the payment request and sending a portion of the payment from the software image distribution system to a source system of the software image file set. Advantages can include distributed transaction control.

In addition to one or more of the features described above, or as an alternative to any of the foregoing embodiments, further embodiments may include receiving, at the software image distribution system, an installation complete signal from the machine based on installation and enablement of the software image on the machine and triggering a completion action responsive to the installation complete signal. Advantages can include controlling a completion process.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
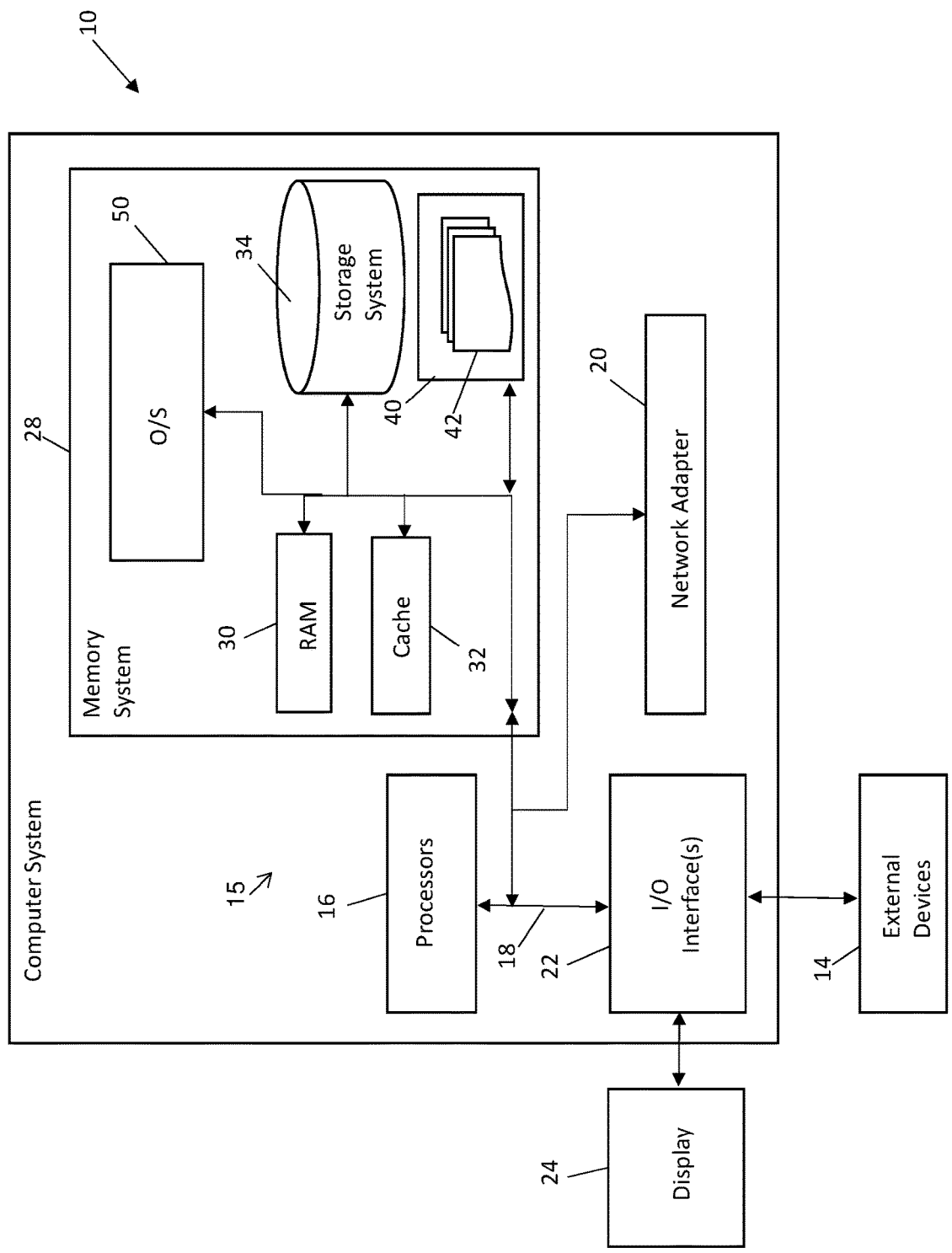
FIG. 1 is a block diagram illustrating a computer system in accordance with various embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, in computer systems, processing units (PUs) can include computer system resources that support processing system operation, such as processor chips, I/O cards, and memory used by application software. PUs are typically enabled based on operating system capability rather than dynamically adjusted based on planned workloads. Computer system configurations that statically assign PU capacity may reduce PU capacity available to other workloads as new workloads (e.g., software images) are installed on a machine. This can limit the performance characteristics of new workloads that may be installed after the machine is deployed.

Turning now to an overview of the aspects of the invention, one or more embodiments of the invention address the above-described shortcomings of the prior art by bundling PU usage with software image types to dynamically define pairings of software image type and an allocation of the PUs through processing unit subtype identifiers. Embodiments can enable a two-dimensional resource classification to license workload types (PU types) with application types (PU subtypes). An application identifier can be associated with an appliance type, which can be defined to differ from preexisting infrastructure configurations. An appliance (also referred to as a software appliance) can be a software application that includes sufficient operating system support to run on hardware or in a virtual machine. Resources can be assigned and managed that constrain availability for each subtype such that available PUs are distributed between multiple subtype definitions to more efficiently pool computer system resources.

The above-described aspects of the invention address the shortcomings of the prior art by uniquely creating an application identifier to tie resources to specific appliance types. License records can be used to track appliance identifiers associated with groups of PUs. PU pools can be dynamically created and updated responsive to license records. On creation of logical partitions on a machine, the PU pools can be used for resource selection. Technical effects and benefits can include constraining resource utilization through the use of subtypes that limit the amount of processing resources available to an application of a predetermined type. Advantages can include allocating sufficient processing resources to support execution of a particular software image and retaining processing unit capability for execution of additional software images, tracking machine-level resource availability of processing units as deployment reduces available resources, tracking availability of processing units for specific software image types, allocating multiple types of processing resources, sharing of processing unit capabilities across multiple logical partitions, making multiple types of logical partitions available, and/or constraining multiple parameters of software image deployment. In the context of distribution of software images, advantages can include controlling software image distribution with capacity requirements to be allocated at deployment, transmission of the software image and the license record to the machine, distributed transaction control, and/or controlling a completion process.

With reference now to FIG. 1, a computer system 10 is illustrated in accordance with a non-limiting embodiment of the present disclosure. The computer system 10 may be based on the z/Architecture, for example, offered by International Business Machines Corporation (IBM). The architecture, however, is only one example of the computer system 10 and is not intended to suggest any limitation as to the scope of use or functionality of embodiments described herein. Regardless, computer system 10 is capable of being implemented and/or performing any of the functionality set forth hereinabove.

Computer system 10 is operational with numerous other computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Further, elements of the computer system 10 can be incorporated in one or more network devices to support computer network functionality, such as a network switch, a network router, or other such network support devices.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system 10 is shown in the form of a computing device, also referred to as a processing device. The components of computer system may include, but are not limited to, a plurality of processing resources (referred to generally as processing units 15) which may include one or more processors 16 with one or more processing cores, a memory system 28, and a bus 18 that operably couples various system components including memory system 28 to processors 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that are accessible by computer system/server 10, and they include both volatile and non-volatile media, removable and non-removable media.

Memory system 28 can include an operating system (OS) 50, along with computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory system 28 may include at least one program product having a set (e.g., at least one) of program modules that are configured to carry out the functions of embodiments of the disclosure.

The OS 50 controls the execution of other computer programs and provides scheduling, input-output control, file and data management, memory management, and communication control and related services. The OS 50 can also include communication protocol support as one or more drivers to implement various protocol layers in a protocol stack (e.g., transmission control protocol/internet protocol (TCP/IP)) to support communication with other computer systems across one or more computer networks.

The storage system 34 can store a basic input output system (BIOS). The BIOS is a set of essential routines that initialize and test hardware at startup, start execution of the OS 50, and support the transfer of data among the hardware devices. When the computer system 10 is in operation, at least one of the processors 16 is configured to execute instructions stored within the storage system 34, to communicate data to and from the memory system 28, and to generally control operations of the computer system 10 pursuant to the instructions.

Program/utility 40, having a set (at least one) of program modules 42, may be stored in memory system 28 by way of example, and not limitation, as well as the OS 50, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein at an application layer level in a communication protocol stack.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, processing accelerators, external disk drive arrays, RAID systems, tape drives, data archival storage systems, etc.

Figure 2:
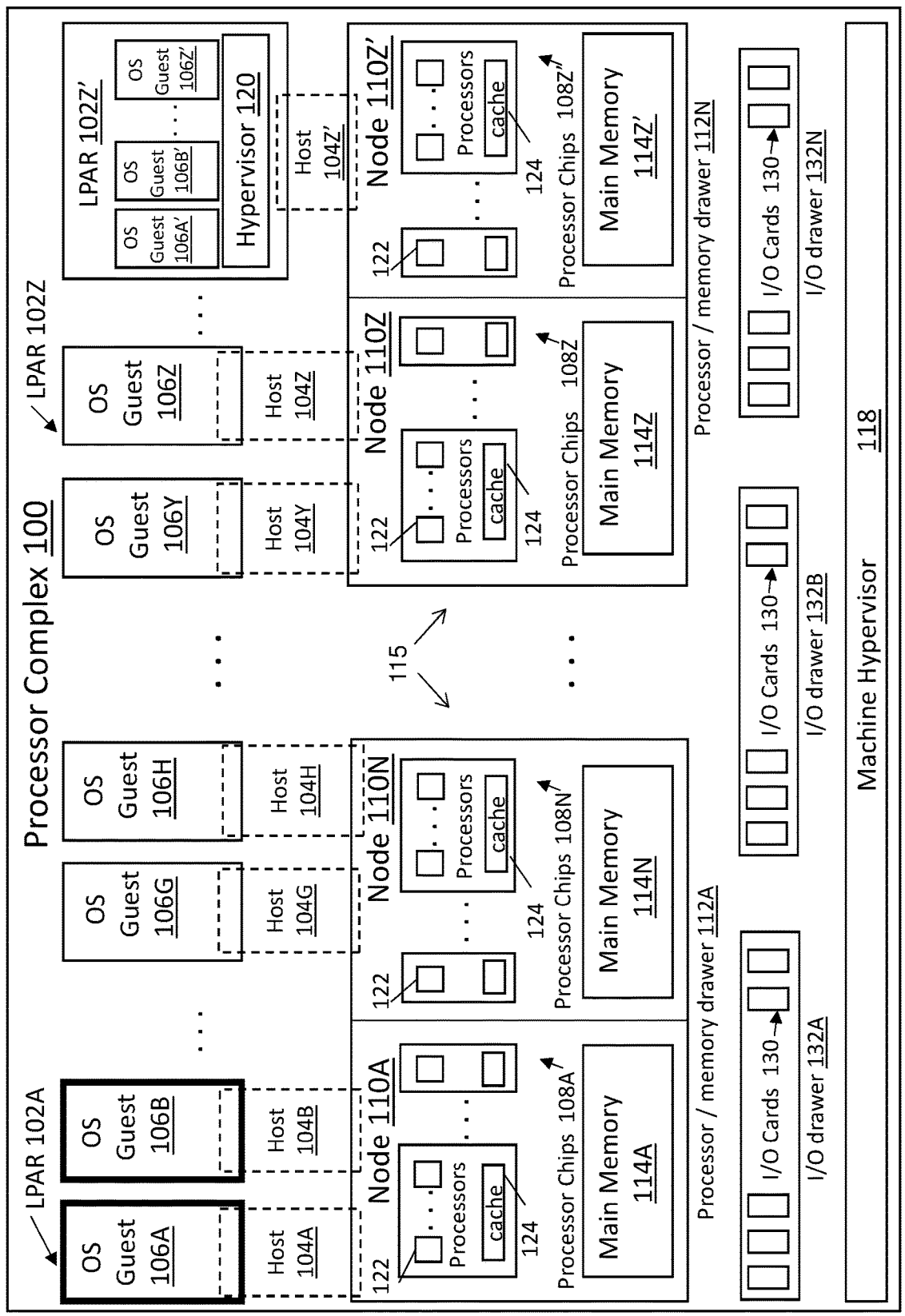
FIG. 2 is a block diagram of a system according to a non-limiting embodiment.

The example of FIG. 2 depicts a processor complex 100 as an example of a system that can implement embodiments of the invention. Multiple logical partitions (LPARs) 102A-102Z can be defined to allocate a plurality of processing and memory resources of hosts 104A-104Z to a plurality of OS guests 106A-106Z. Each of the hosts 104A-104Z may provision specific processing and memory resources to corresponding OS guests 106A-106Z, and the allocation of resources can change dynamically over a period of time. In the example of FIG. 2, host 104A and host 104B are allocated to processor chips 108A of a processing node 110A in a processor drawer 112A. Each of the hosts 104A and 104B may have specific portions of main memory 114A allocated for respective OS guests 106A and 106B with shared access to processor chips 108A and a system controller 116A. The processor drawer 112A is an example of a physical partition that can group multiple processing nodes 110A-110N in close physical proximity. OS guests 106G and 106H can access processing and memory resources of processing node 110N in processor drawer 112A through respective hosts 104G and 104H, which may include dedicated space in main memory 114N and shared access to processor chips 108N and system controller 116N.

Processor drawer 112N within processor complex 100 can share a same machine hypervisor 118 as other drawers, such as processor drawer 112A, to support shared access and resource allocation throughout the processor complex 100. Processor drawer 112N includes processing nodes 110Z and 110Z'. Host 104Y and host 104Z are allocated to processor chips 108Z of processing node 110Z in processor drawer 112N. Each of the hosts 104Y and 104Z may have specific portions of main memory 114Z allocated for respective OS guests 106Y and 106Z with shared access to processor chips 108Z and system controller 116Z. Host 104Z' can be allocated to processor chips 108Z' in processing node 110Z' in processor drawer 112N with main memory 114Z' and system controller 116Z'. Rather than a single OS guest, LPAR 102Z' can allocate a plurality of second-level guests that share access to host 104Z' through a hypervisor 120, including OS guest 106A' and 106B'-106Z'.

The processor chips 108A-108Z' can each include multiple processors 122 and cache 124. Although a specific configuration is depicted in FIG. 2, it will be understood that any number of drawers, nodes, processor chips, memory systems, hosts, and/or guests can be implemented in embodiments as described herein. Move operations and other interactions may be performed using operations managed, for example, by one or more I/O cards 130 in I/O drawers 132A, 132B, up to 132N. The processors 122, processor chips 108, memory 114, I/O cards 130, and/or other processing system resources depicted in FIG. 2 are examples of processing units 115 that can be assigned, tracked, and/or otherwise managed by embodiments. Further, embodiments may manage processing units 115 at a physical level, for instance, through machine hypervisor 118 or at a logical level, such as through hypervisor 120. Further, firmware and/or other resources (not depicted) can manage partitioning and pooling of the processing units 115 are further described herein.

Figure 3:
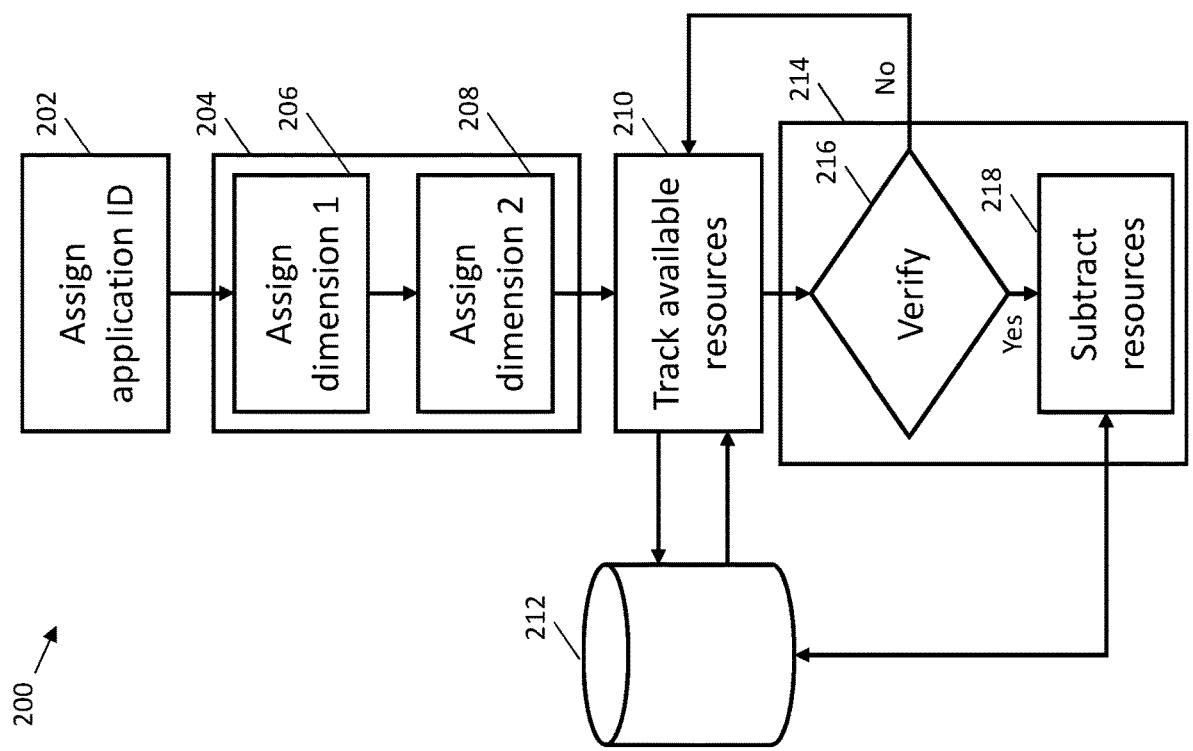
FIG. 3 is a flow diagram illustrating an assignment and verification process according to a non-limiting embodiment.

FIG. 3 depicts a flow diagram illustrating an assignment and verification process 200 according to a non-limiting embodiment. The process 200 can be performed by a computer system management component, such as the machine hypervisor 118 of FIG. 2. Although described in reference to the processor complex 100 of FIG. 2, the process 200 may be performed by the computer system 10 of FIG. 1 or other system configurations not depicted.

At block 202, an identifier can be assigned to an application as an application ID. The application ID can be a unique ID associated with a software image type to define allocation limits of one or more of the processing units 115 of FIG. 2.

At block 204, a dimensional classifier can be assigned to a license record, which can include assigning a workload classifier or processing unit type in a first dimension 206 and assigning an application type (e.g., an application ID) in a second dimension 208. For example, the workload classifier can define allocations of the processing units 115 of FIG. 2 as using one or more of: a central processor (CP), integrated facility for Linux (IFL), z-information processor (ZIP), internal coupling facility (ICF), system assist processor (SAP), integrated firmware processor (IFP), and/or other types of processing units 115, such as memory resources, I/O card resources, and the like. The application ID may define a software image type that uses a subset of the processing units 115 defined in the second dimension 208. License records can hold various information to support time constrained assignment of processing units 115. For example, a license record can include information such as a serial number, a lifetime, a processing unit type, an application ID, and signature to confirm that the license record is uncorrupted. Table 1 depicts an example machine configuration after a license record has been installed with a processing unit type of 3 IFL and an application ID of 5.

TABLE 1

Example machine configuration

| Processing Unit Type | Processing Unit Subtype | Amount |
|---|---|---|
| IFL | 0 | 10 |
| ZIP | 0 | 2 |
| CP | 0 | 1 |
| IFL | 5 | 3 |

Thus, an application ID with a value of 5 can correspond with a processing unit subtype of 5, where three IFL processing units are assigned, as opposed to a processing unit type of IFL with processing unit subtype of 0, which would default in assigning ten IFL processing units.

At block 210, tracking of available resources is performed in the first dimension 206 and the second dimension 208, for instance, using storage 212 to determine whether resources are available for further assignment. The tracking can be performed as license records are created with further evaluations performed at activation time.

At block 214, license record evaluation is performed. License record evaluation can include a verification 216 to determine whether an appliance type specified in an appliance ID matches an ID stored in a license record. If a match is not found, the process 200 can revert to tracking of available resources at block 210. If a match is identified between an application ID and an ID stored in a license record, at block 218, individually used resources are subtracted from both the first dimension 206 and the second dimension 208 at activation time, with a corresponding update made to storage 212.

Figure 4:
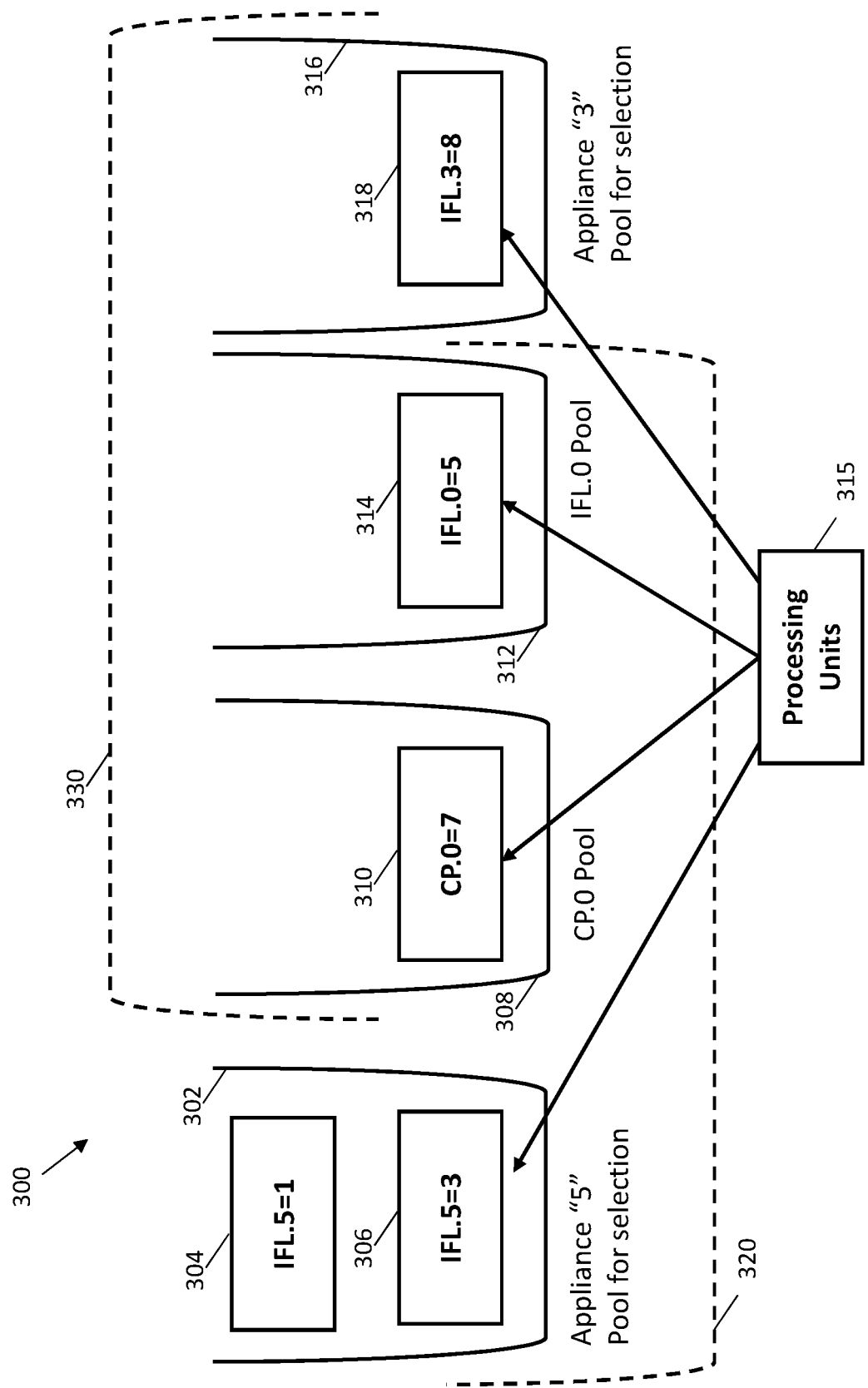
FIG. 4 is a block diagram illustrating logical partition selection pools according to a non-limiting embodiment.

FIG. 4 depicts an example of processing unit pooling 300 to support multiple logical partitions, such as LPARs 102 of FIG. 2. In the example of FIG. 4, processing unit pool 302 of processing unit subtype 5 (e.g., appliance ID of 5) includes a first processing unit group 304 of IFL, with processing unit subtype 5, having one IFL processing unit assigned. The processing unit pool 302 also includes a second processing unit group 306 of IFL, with processing unit subtype 5, having three IFL processing units assigned. Processing unit pool 308 is an example of a CP subtype-0 pool having a processing unit group 310 of seven CP processing units assigned. Processing unit pool 312 is an example of an IFL subtype-0 pool having a processing unit group 314 of five IFL processing units assigned. Processing unit pool 316 is an example of an IFL subtype-3 pool (e.g., appliance ID of 3) having a processing unit group 318 of eight IFL processing units assigned.

The processing unit pools 302, 308, 312, and 316 can be further grouped by logical partitions that can assign processing units 315 depending on which logical partitions are active. For example, LPAR 320 can include processing unit pools 302, 308, and 312, while LPAR 330 may include processing unit pools 308, 312, and 316. Thus, LPAR 320 can make 9 IFL processing units available (1+3+5) and 7 CP processing units available, while LPAR 330 makes 13 IFL processing units available (5+8) and 7 CP processing units available. IFL subtype-0 and CP subtype-0 may both appear as available pools until assigned to a dedicated LPAR, such as LPAR 320 or LPAR 330. If there is an insufficient number of processing units 315 of a desired type available, one of the LPARs 320, 330 may be blocked from activation or processing units 315 may be shared between LPARs 320, 330 where an overlap exists (e.g., processing unit pools 308, 312).

Figure 5:
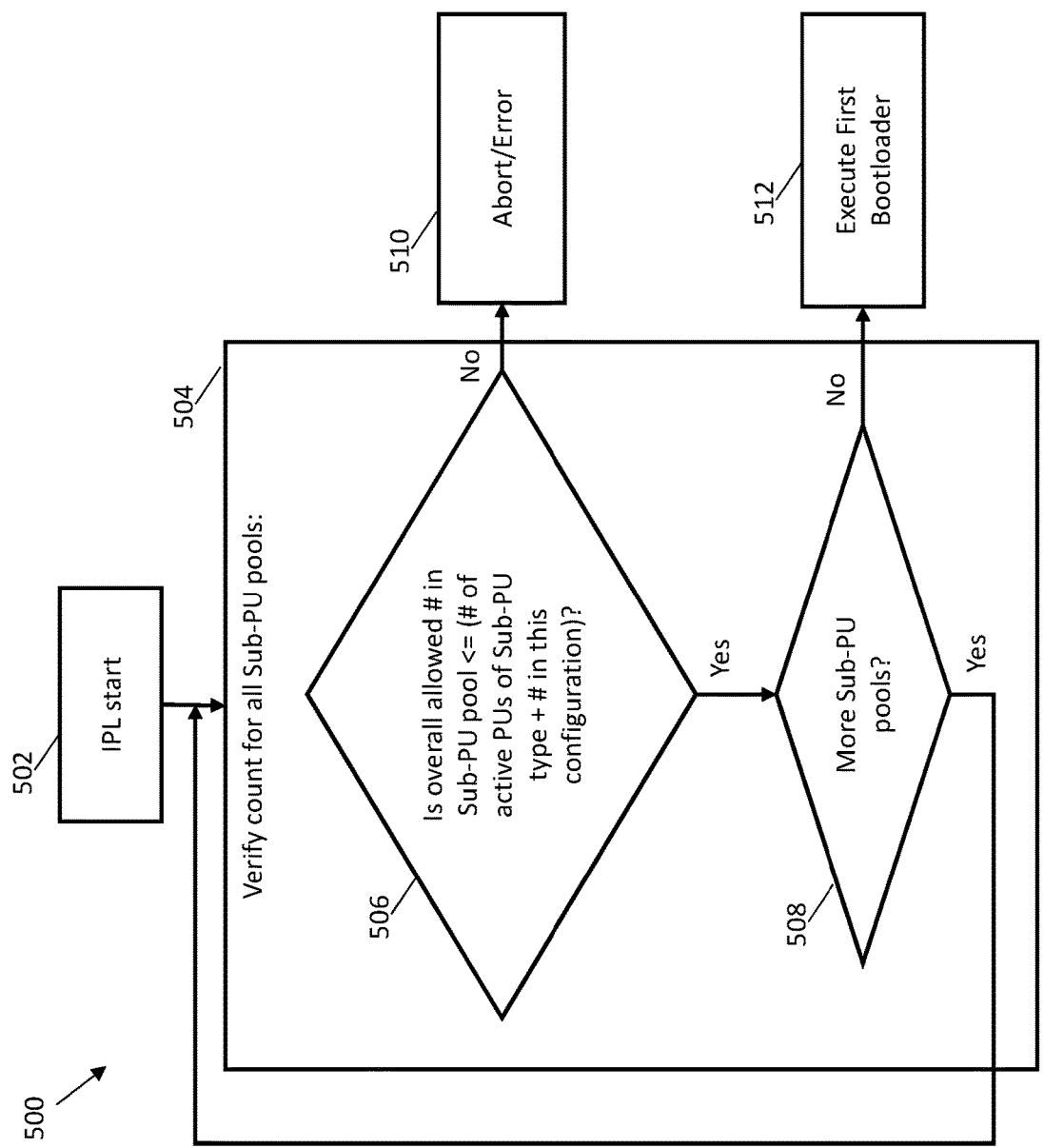
FIG. 5 is a flow diagram illustrating an initial program load evaluation process according to a non-limiting embodiment.

FIG. 5 depicts a flow diagram illustrating an evaluation process 500 according to a non-limiting embodiment. The evaluation process 500 is an example of an appliance LPAR evaluation for an initial program load. For example, the evaluation process 500 may be performed by the machine hypervisor 118 of FIG. 2 when configuring LPAR 320 or LPAR 330 of FIG. 4. On an initial program load start 502, a verification 504 (blocks 506 and 508) can count the processing units 315 of FIG. 4 for processing unit pools (including processing unit subtypes, e.g., processing unit type.application classifier), such as processing unit pools 302, 308, 312, and 316 of FIG. 4. At block 506, a check can be performed to determine whether an overall allowed number in a processing unit pool is less than or equal to the sum of the number of active processing units of an associated processing unit subtype plus a number of processing units in the same configuration. If so, then the process 500 advances to block 508; otherwise, the process 500 can abort with an error code at block 510.

At block 508, a check is performed to determine whether more processing unit pools are available for evaluation, and if so, the process 500 continues with the verification 504 by evaluating another processing unit pool. If there are no more processing unit pools to evaluate at block 508, the process 500 can proceed to block 512 to execute a first bootloader to continue with resource allocation for a software image.

Figure 6:
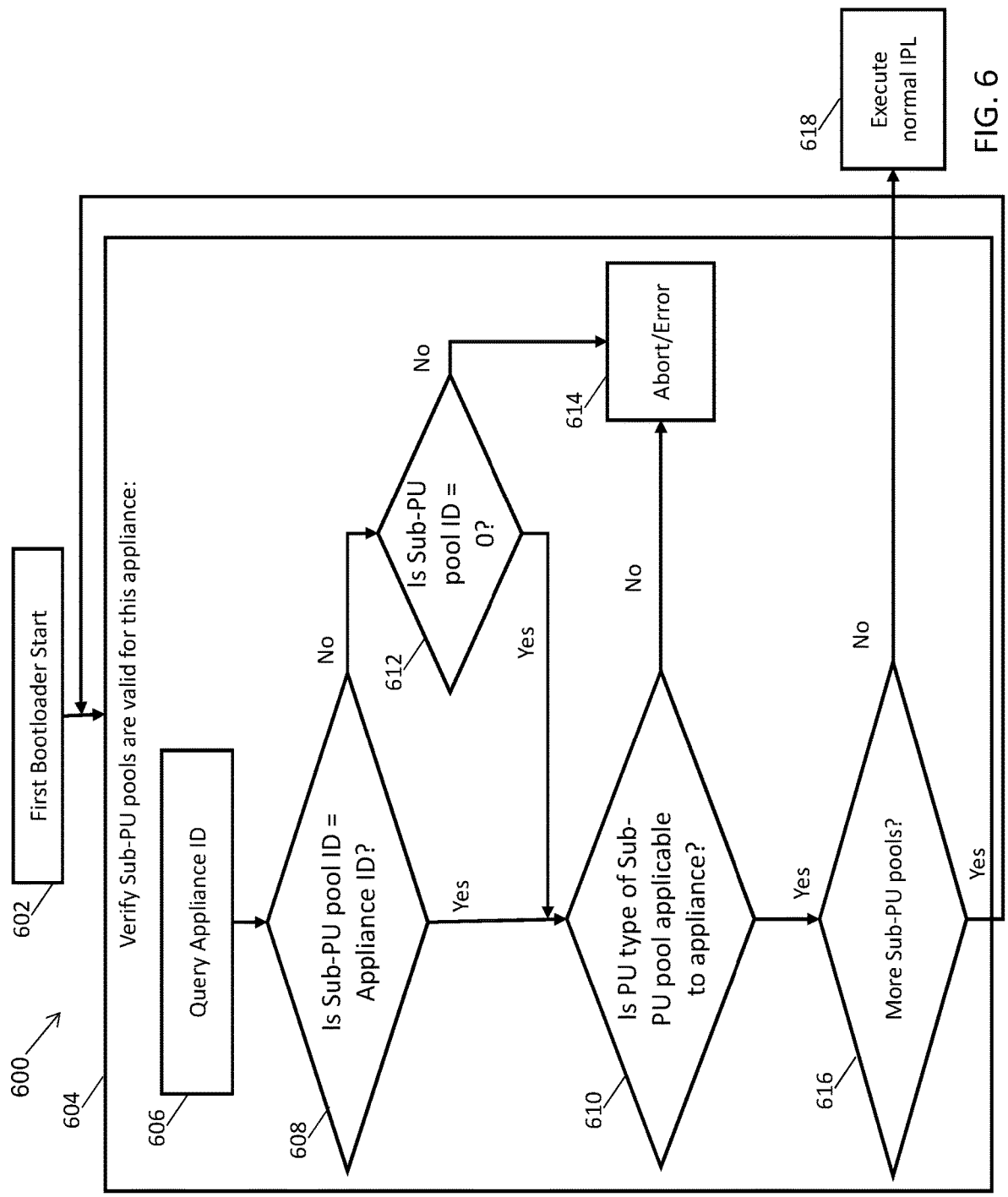
FIG. 6 is a flow diagram illustrating a bootloader evaluation process according to a non-limiting embodiment.

FIG. 6 depicts a flow diagram illustrating an evaluation process 600 according to a non-limiting embodiment. Upon starting a first bootloader at block 602, which may be continued from block 512 of FIG. 5, a verification 604

(blocks 606-616) can be performed to check the validity of processing unit pools, such as processing unit pools 302, 308, 312, and 316 of FIG. 4. At block 606, an appliance ID can be queried. The appliance ID may be part of a signed license record building into a software image for an appliance. At block 608, a processing unit pool identifier (e.g., a processing unit subtype of a processing unit pool) is compared with the appliance ID. If there is a match at block 608, the process 600 continues to block 610; otherwise, the process 600 branches to block 612. At block 612, if the processing unit pool identifier is zero, then the process 600 returns to block 610; otherwise, the process 600 branches to block 614. At block 610, a check is performed as to whether the processing unit type of the processing unit pool is applicable to the appliance, and if so, the process 600 advances to block 616; otherwise, the process 600 can end with an abort and error code at block 614. At block 616, if there are more processing unit pools to evaluate, the process 600 can continue with verification 604; otherwise, at block 618, a normal initial program load can be executed.

Figure 7:
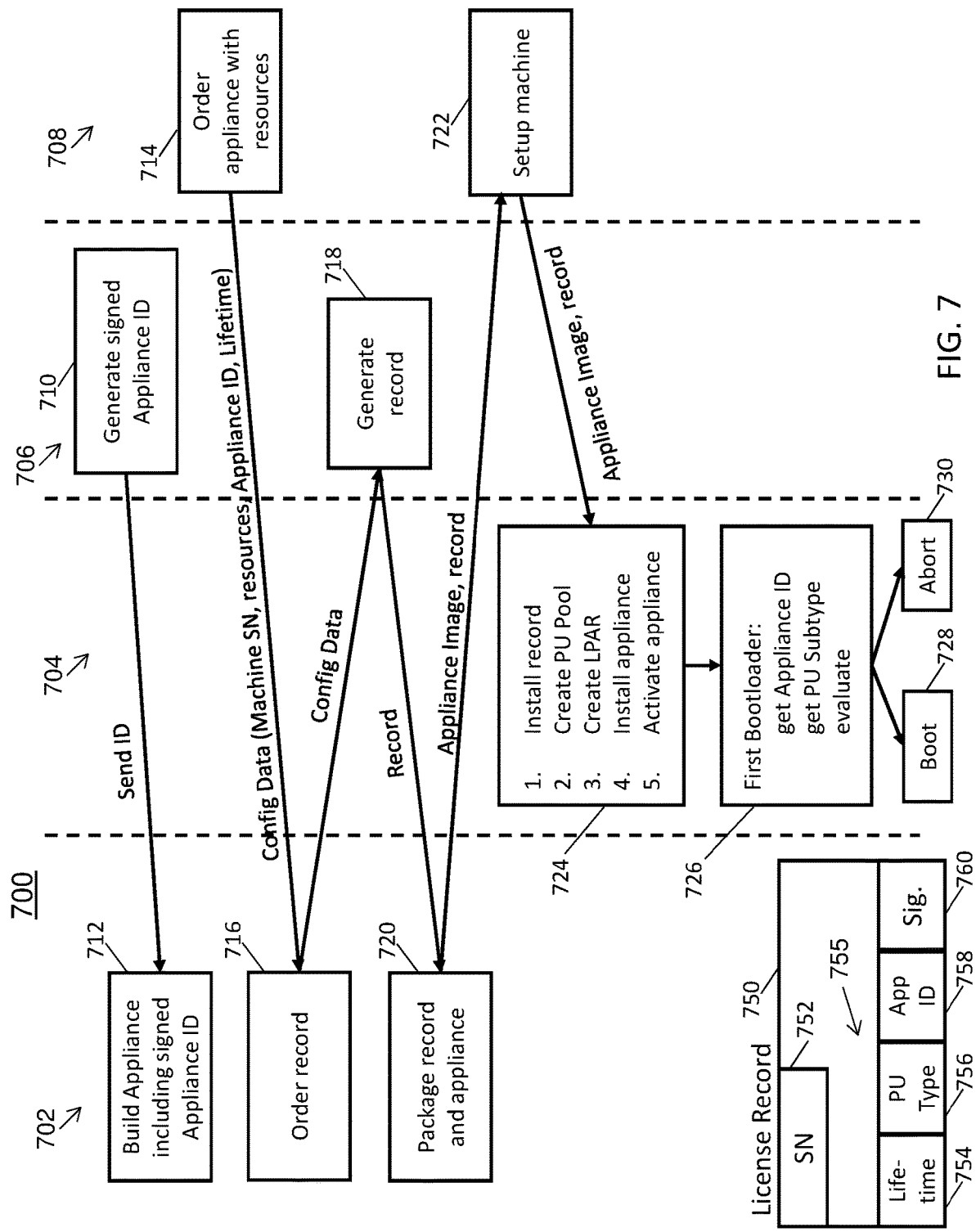
FIG. 7 is a flow diagram illustrating a configuration process according to a non-limiting embodiment.

FIG. 7 is a flow diagram illustrating a configuration process 700 according to a non-limiting embodiment. The configuration process 700 can be partitioned into a plurality of functions performed by multiple entities. For example, entities can include a software image supplier 702, a machine 704, a machine supplier 706, and an end user 708. The machine 704 can be an instance of the computer system 10 of FIG. 1, processor complex 100 of FIG. 2, and/or another computer system (not depicted). At block 710, the machine supplier 706 can generate and send an appliance ID to the software image supplier 702. At block 712, the software image supplier 702 can build an appliance including the signed appliance ID received from block 710. The appliance can be a program/utility 40 of FIG. 1 for the OS 50 of FIG. 1 or one of the OS guests 106A-106Z' of FIG. 2, for example.

At block 714, the end user 708 can order an appliance with resources from the software image supplier 702 or another source. The order can be associated with configuration data, such as a machine serial number identifying the machine 704, resources identifying an allocation of processing units 315 of FIG. 4 needed, an appliance ID, and a duration (e.g., a lifetime before access expires). The appliance ID is an example of a software image identifier that can be used by the software image supplier 702 to correlate a license record 750 for the end user 708 to a specific allocation of resources on the machine 704. The software image supplier 702 can order 716 a license record 750 from the machine supplier 706 using the configuration data from the end user 708 in combination with data from the software image supplier 702. Thus, the order is an order for both hardware and software resources, rather than only software resources.

At block 718, the machine supplier 706 can generate the license record 750 and provide the license record 750 to the software image supplier 702. A simplified example of the license record 750 can include a serial number 752, a lifetime 754, a processing unit type 756, an application ID 758, and a signature 760. The processing unit type 756 and application ID 758 may collectively form a processing unit subtype identifier 755. At block 720, the software image supplier 702 can package the license record 750 and appliance image (e.g., a software image) and provide the license record 750 and appliance image to the end user 708. At block 722, the end user 708 can initiate a setup of the machine 704 including the license record 750 and appliance image.

At block 724, the machine 704 can install the license record 750, which may include performing the process 200 of FIG. 3. The machine 704 can also create one or more processing unit pools and one or more LPARs, such as processing unit pools 302, 308, 312, and 316 and LPARs 320, 330 of FIG. 4. To support installing and activating the appliance, the machine 704 can also perform process 500 of FIG. 5. Upon successfully completing block 724, the machine 704 can perform block 726 that includes operations of a first bootloader as part of runtime enforcement. Block 726 can include process 600 of FIG. 6 to get the appliance ID, get a processing unit subtype, and evaluate to either successfully boot 728 the software image of the appliance or abort 730.

Although a number of steps are illustrated as being performed by particular entities in FIG. 7, it will be understood that additional steps can be added, steps can be performed by other entities, and steps can be combined or otherwise omitted.

Figure 8:
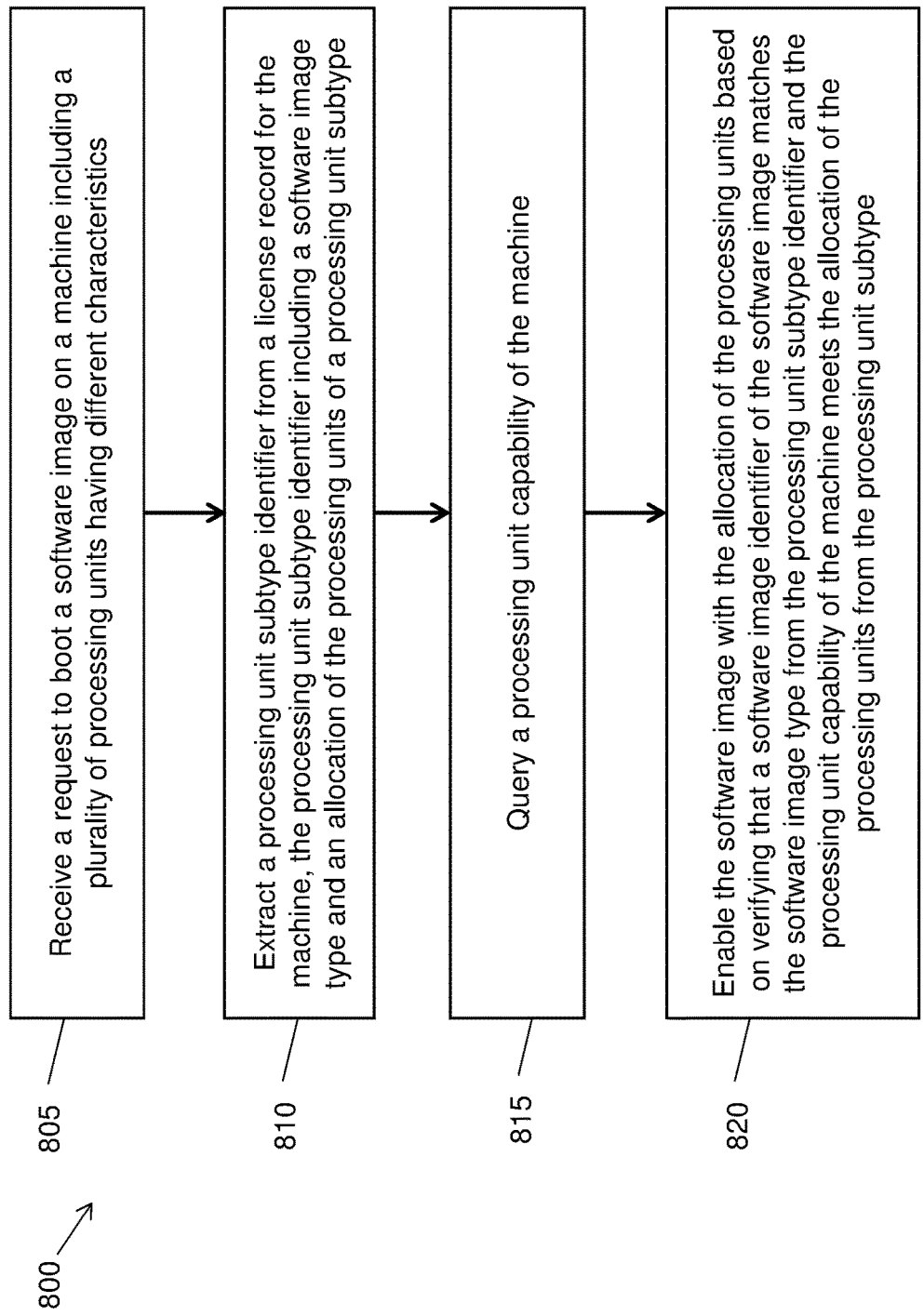
FIG. 8 is a flow diagram illustrating a method according to a non-limiting embodiment.

Turning now to FIG. 8, a flow diagram of a process 800 is generally shown in accordance with an embodiment. The process 800 is described with reference to FIGS. 1-8 and may include additional steps beyond those depicted in FIG. 8. The process 800 can be performed, for example, by a processing circuit of the computer system 10 of FIG. 1, processor complex 100 of FIG. 2, and/or another computer system (not depicted).

At block 805, a request can be received to boot a software image (e.g., an appliance) on a machine 704 that includes a plurality of processing units 15, 115, 315 having different characteristics. The processing units 15, 115, 315 can include one or more of processor chips, memory resources, disk resources, and input/output card resources. The different characteristics can include, for example, features tuned for general data processing, graphical data processing, input/output data processing, storage operations, network traffic management, and other such functions. Some processing units 15, 115, 315 may be optimized to coordinate with a particular operating system and/or other specific constraints.

At block 810, a processing unit subtype identifier 755 can be extracted from a license record 750 for the machine 704. The processing unit subtype identifier 755 may include a software image type (e.g., application ID 758) and an allocation of the processing units 15, 115, 315 of the processing unit subtype (e.g., processing unit type 756). For instance, the processing unit type 756 may indicate a value of "3 IFL" while the application ID 758 may indicate a value of "5" corresponding to the last line in table 1 in a previous example.

At block 815, a processing unit capability of the machine 704 can be queried. For instance, a check can be performed to determine whether a sufficient number of processing units 15, 115, 315 of the desired subtype are available to meet the request.

At block 820, the software image with the allocation of the processing units 15, 115, 315 can be enabled based on verifying that a software image identifier of the software image matches the software image type from the processing unit subtype identifier 755 and the processing unit capability of the machine 704 meets the allocation of the processing units 15, 115, 315 from the processing unit subtype 756.

In some embodiments, an indicator of the overall availability of the processing units 15, 115, 315 of the machine 704 can be adjusted based on a plurality of software images with the allocation of the processing units 15, 115, 315 as deployed. For instance, an indicator of overall available processing units 15, 115, 315 of the machine 704 can be adjusted based on the allocation of the processing units 15, 115, 315 with a plurality of deployed software images by subtracting the number of processing units 15, 115, 315 in use by deployed software from the number of overall available processing units 15, 115, 315 of the machine 704. An indicator of enablement availability of the software image type of the processing units 15, 115, 315 can be adjusted based on deploying the software image. Indicators of the overall availability and/or enablement availability may be tracked in the storage 212, for example.

The processing unit capability of the machine 704 can be shared across a plurality of logical partitions (e.g., LPARs 102A-102Z', 320, 330), and the software image and one or more other workloads can be configured to execute in separate logical partitions. The license record 750 can be installed on the machine 704 responsive to receiving the software image and license record data. A processing unit subtype pool identifier can be created on the machine 704 that associates the allocation of the processing units 15, 115, 315 with the software image type. A logical partition pool can be created that makes the processing unit subtype pool identifier and one or more identifiers associated with one or more other workloads available for selection in the logical partitions. The license record data can associate the software image identifier (e.g., application ID 758), the allocation of the processing units (e.g., processing unit type 756), a duration (e.g., lifetime 754), and an identifier of the machine (e.g., serial number 752) responsive to a data exchange between a plurality of entities, such as the software image supplier 702, machine 704, machine supplier 706, and/or end user 708.

Figure 9:
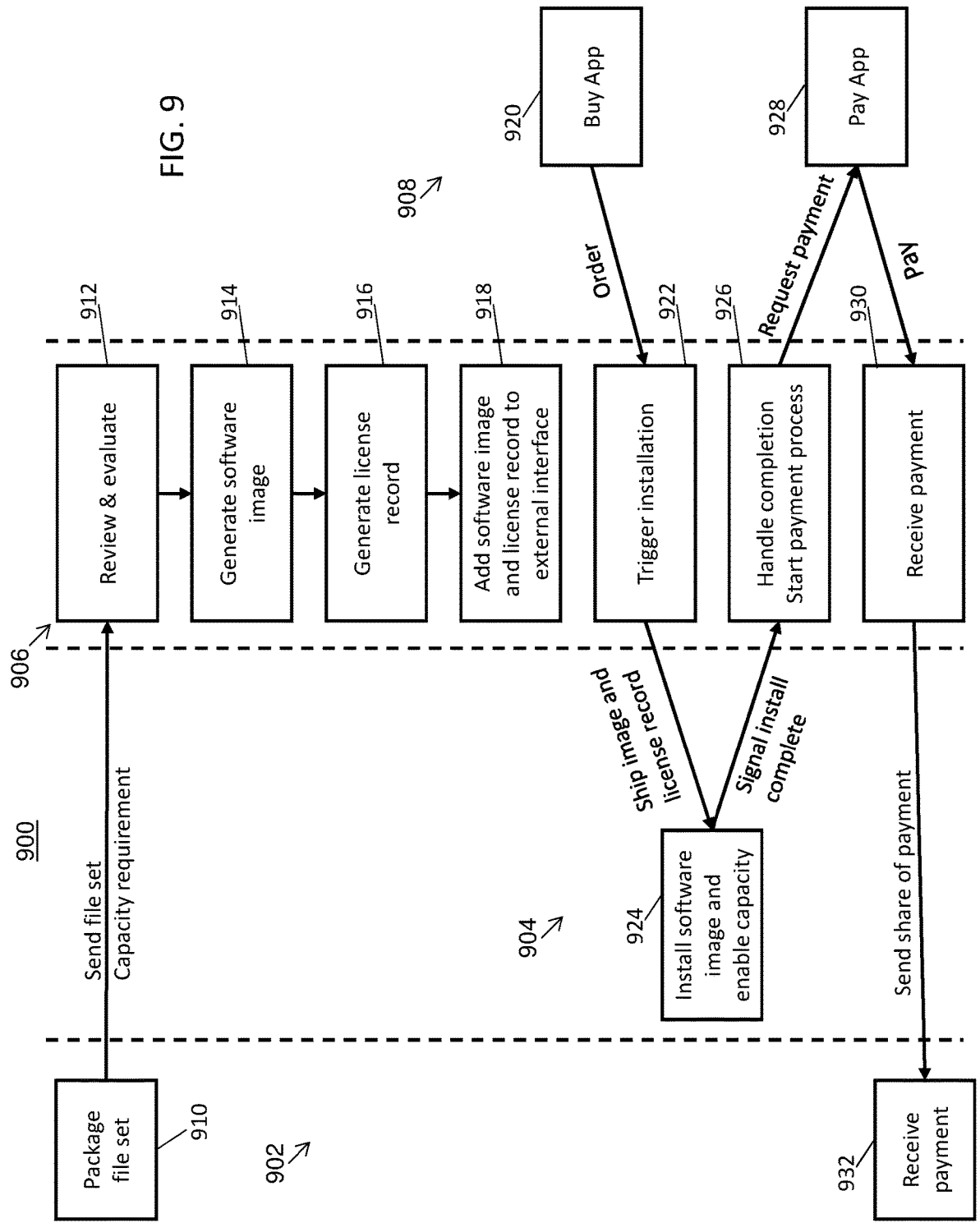
FIG. 9 is a flow diagram illustrating a distribution process according to a non-limiting embodiment.

FIG. 9 is a flow diagram illustrating a distribution process 900 according to a non-limiting embodiment. The distribution process 900 can be partitioned into a plurality of functions performed by multiple entities. For example, entities can include a source system 902, a machine 904, a software image distribution system 906, and an ordering system 908. The source system 902 can be an embodiment of the software image supplier 702 of FIG. 7, the machine 904 can be an embodiment of the machine 704 of FIG. 7, and the ordering system 908 can be an embodiment of the end user 708 of FIG. 7. The source system 902 can package an application as a software image file set 910 and provide the software image file set 910 with a capacity requirement to the software image distribution system 906. At block 912, the software image distribution system 906 can review and evaluate the software image file set 910, which may be in various formats depending on interfacing requirements of the software image distribution system 906. The software image distribution system 906 can generate a software image 914 based on the software image file set 910, for instance, using compilers, linkers, and support software. The software image distribution system 906 can generate a license record 916 based on the capacity requirement. The software image distribution system 906 can add the software image 914 and the license record 916 to an external interface 918 of the software image distribution system 906, such as an app store.

The ordering system 908 can include an ordering interface to a buying application 920 to order the software image 914. Ordering of the software image 914 includes ordering of hardware resources to support execution of the software image 914. The software image distribution system 906 can trigger installation 922 of the software image 914 with the license record 916 on the machine 904. At block 924, the machine 904 can install the software image 914 and enable capacity defined in the license record 916 on the machine 904. The machine 904 can signal installation completion to the software image distribution system 906. The software image distribution system 906 can handle completion and start a payment process 926 to request payment from a payment application 928 of the ordering system 908. The payment application 928 can send a payment authorization to the software image distribution system 906 that receives payment 930 and can send a share of the payment to the source system 902 that receives the payment 932.

Figure 10:
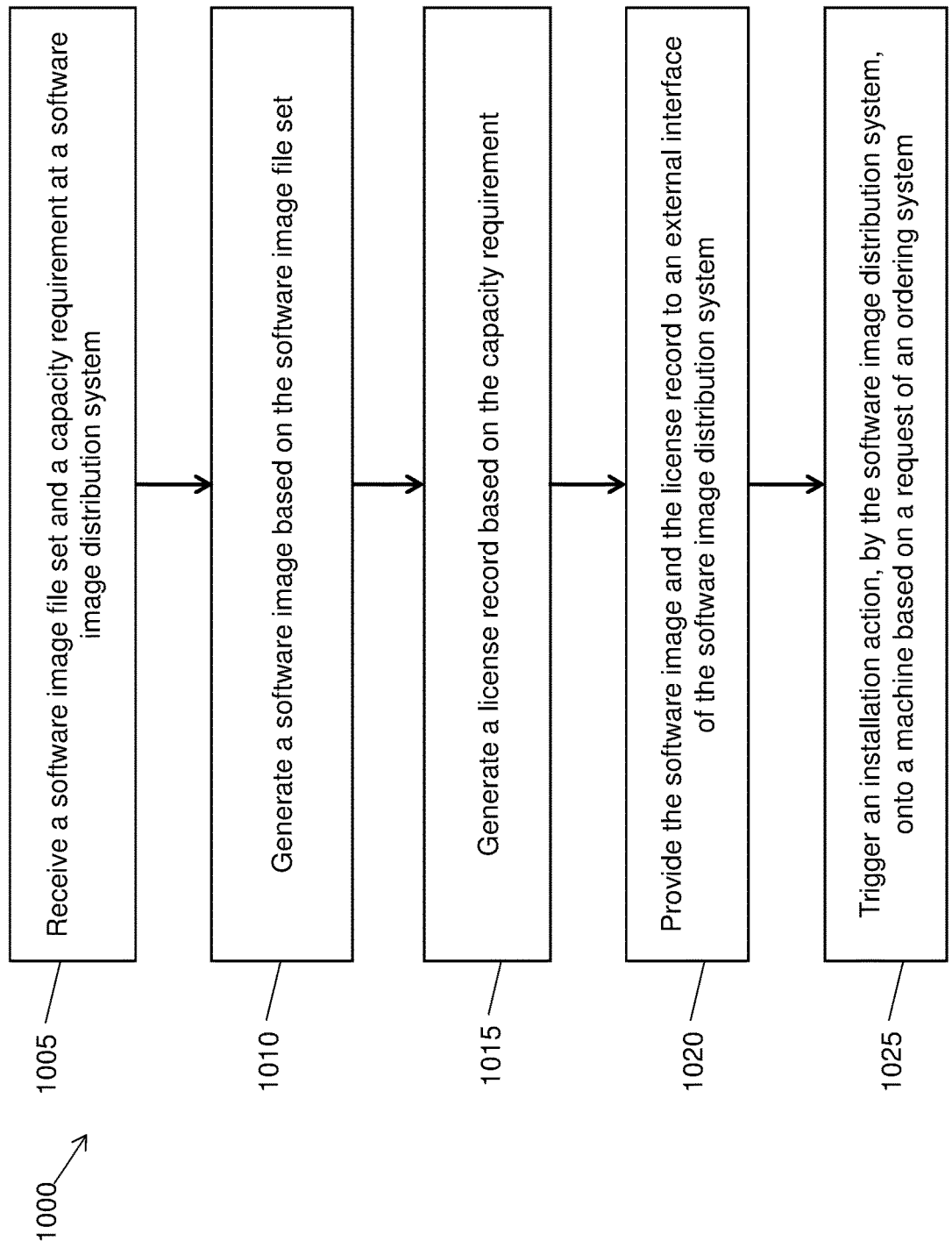
FIG. 10 is a flow diagram illustrating a method according to a non-limiting embodiment.

Turning now to FIG. 10, a flow diagram of a process 1000 is generally shown in accordance with an embodiment. The process 1000 is described with reference to FIGS. 1-10 and may include additional steps beyond those depicted in FIG. 10. The process 1000 can be performed, for example, by a processing circuit of the computer system 10 of FIG. 1, processor complex 100 of FIG. 2, and/or another computer system (not depicted). The process 1000 is a variation of the distribution process 900 of FIG. 9 primarily from the perspective of the software image distribution system 906 of FIG. 9.

At block 1005, the software image distribution system 906 receives software image file set 910 and a capacity requirement. At block 1010, the software image distribution system 906 generates a software image 914 based on the software image file set 910. At block 1015, the software image distribution system 906 generates a license record 916 based on the capacity requirement. At block 1020, the software image distribution system 906 provides the software image 914 and the license record 916 to an external interface of the software image distribution system 906 that may be observed by the ordering system 908. At block 1025, the software image distribution system 906 triggers an installation action on to a machine 904 based on a request of the ordering system 908. Triggering the installation action can further include sending the software image 914 and the license record 916 to the machine 904.

In some embodiments, a completion notification including a payment request can be sent from the software image distribution system 906 to the ordering system 908. A payment can be received at the software image distribution system 906 responsive to the payment request. A portion of the payment can be sent from the software image distribution system 906 to a source system 902 of the software image file set 910. The software image distribution system 906 can receive an installation complete signal from the machine 904 based on installation and enablement of the software image 914 on the machine 904. A completion action can be triggered responsive to the installation complete signal, such as triggering a payment request to the ordering system 908.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving a request to boot a software image on a machine comprising a plurality of processing units having different characteristics;
   extracting a processing unit subtype identifier from a license record for the machine, the processing unit subtype identifier comprising a software image type and an allocation of the processing units of a processing unit subtype;

querying a processing unit capability of the machine; and enabling the software image with the allocation of the processing units based on verifying that a software image identifier of the software image matches the software image type from the processing unit subtype identifier and that the processing unit capability of the machine meets the allocation of the processing units from the processing unit subtype.

2. The computer-implemented method of claim 1, further comprising:

adjusting an indicator of overall available processing units of the machine based on the allocation of the processing units with a plurality of deployed software images.

3. The computer-implemented method of claim 1, further comprising:

adjusting an indicator of enablement availability of the software image type of the processing units based on deploying the software image.

4. The computer-implemented method of claim 1, wherein the processing units comprise one or more of: processor chips, memory resources, disk resources, and input/output card resources.

5. The computer-implemented method of claim 1, wherein the processing unit capability of the machine is shared across a plurality of logical partitions, and the software image and one or more other workloads are configured to execute in separate logical partitions.

6. The computer-implemented method of claim 5, further comprising:

installing the license record on the machine responsive to receiving the software image and license record data;

creating a processing unit subtype pool identifier on the machine that associates the allocation of the processing units with the software image type; and creating a logical partition pool that makes the processing unit subtype pool identifier and one or more identifiers associated with one or more other workloads available for selection in the logical partitions.

7. The computer-implemented method of claim 6, wherein the license record data associates the software image identifier, the allocation of the processing units, a duration, and an identifier of the machine responsive to a data exchange between a plurality of entities.

8. A system comprising:

a plurality of processing units on a machine, the processing units having different characteristics; and a processing circuit configured to perform a plurality of operations comprising:

receiving a request to boot a software image on the machine;

extracting a processing unit subtype identifier from a license record for the machine, the processing unit subtype identifier comprising a software image type and an allocation of the processing units of a processing unit subtype;

querying a processing unit capability of the machine; and enabling the software image with the allocation of the processing units based on verifying that a software image identifier of the software image matches the software image type from the processing unit subtype identifier and that the processing unit capability of the machine meets the allocation of the processing units from the processing unit subtype.

9. The system of claim 8, wherein the processing circuit is further configured to perform operations comprising:

adjusting an indicator of overall available processing units of the machine based on the allocation of the processing units with a plurality of deployed software images.

10. The system of claim 8, wherein the processing circuit is further configured to perform operations comprising:

adjusting an indicator of enablement availability of the software image type of the processing units based on deploying the software image.

11. The system of claim 8, wherein the processing units comprise one or more of: processor chips, memory resources, disk resources, input/output card resources.

12. The system of claim 8, wherein the processing unit capability of the machine is shared across a plurality of logical partitions, and the software image and one or more other workloads are configured to execute in separate logical partitions.

13. The system of claim 12, wherein the processing circuit is further configured to perform operations comprising:

installing the license record on the machine responsive to receiving the software image and license record data;

creating a processing unit subtype pool identifier on the machine that associates the allocation of the processing units with the software image type; and creating a logical partition pool that makes the processing unit subtype pool identifier and one or more identifiers associated with one or more other workloads available for selection in the logical partitions.

14. The system of claim 13, wherein the license record data associates the software image identifier, the allocation of the processing units, a duration, and an identifier of the machine responsive to a data exchange between a plurality of entities.

15. A computer program product comprising a computer readable storage medium having program instructions embodied therewith, the program instructions executable by a processing circuit to perform a plurality of operations comprising:

receiving a request to boot a software image on a machine comprising a plurality of processing units having different characteristics;

extracting a processing unit subtype identifier from a license record for the machine, the processing unit subtype identifier comprising a software image type and an allocation of the processing units of a processing unit subtype;

querying a processing unit capability of the machine; and enabling the software image with the allocation of the processing units based on verifying that a software image identifier of the software image matches the software image type from the processing unit subtype identifier and that the processing unit capability of the machine meets the allocation of the processing units from the processing unit subtype.

16. The computer program product of claim 15, wherein the program instructions executable by the processing circuit are further configured to perform operations comprising:

adjusting an indicator of overall available processing units of the machine based on the allocation of the processing units with a plurality of deployed software images.

17. The computer program product of claim 15, wherein the program instructions executable by the processing circuit are further configured to perform operations comprising:

adjusting an indicator of enablement availability of the software image type of the processing units based on deploying the software image.

18. The computer program product of claim 15, wherein the processing unit capability of the machine is shared across a plurality of logical partitions, and the software image and one or more other workloads are configured to execute in separate logical partitions.

19. The computer program product of claim 18, wherein the program instructions executable by the processing circuit are further configured to perform the operations comprising:
   installing the license record on the machine responsive to receiving the software image and license record data;
   creating a processing unit subtype pool identifier on the machine that associates the allocation of the processing units with the software image type; and
   creating a logical partition pool that makes the processing unit subtype pool identifier and one or more identifiers associated with one or more other workloads available for selection in the logical partitions.

20. The computer program product of claim 19, wherein the license record data associates the software image identifier, the allocation of the processing units, a duration, and an identifier of the machine responsive to a data exchange between a plurality of entities.

* * * * *